(12) United States Patent
Marks et al.

(10) Patent No.: US 6,826,549 B1
(45) Date of Patent: Nov. 30, 2004

(54) INTERACTIVE HEURISTIC SEARCH AND VISUALIZATION FOR SOLVING COMBINATORIAL OPTIMIZATION PROBLEMS

(75) Inventors: Joseph W. Marks, Belmont, MA (US); Neal B. Lesh, Cambridge, MA (US); David Ratajczak, Atlanta, GA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 09/433,422

(22) Filed: Nov. 4, 1999

(51) Int. Cl.[7] .......................... G06F 17/00; G06F 17/20
(52) U.S. Cl. .............................. 706/11; 706/45; 706/12
(58) Field of Search ............................... 706/11, 12, 45

(56) References Cited

U.S. PATENT DOCUMENTS 5,542,043 A * 7/1996 Cohen et al. ............... 702/108
2002/0008657 A1 * 1/2002 Poore, Jr. .................... 342/96

OTHER PUBLICATIONS

Ki Soo Hwang et al; Constrained Conditional Resource Sharing in Pipeline Synthesis; 11/88; IEEE; CH2657–5/88/0000/0052;52–55.*
Dejan Jovanovic'c et al; Scan: A Decision Support System for Railroad Scheduling; 4/89; IEEE: CH2749–0/89/0000–0097;97–105.*
Allan Heydon et al; The Juno–2 Constraint–Based Drawing Editor; Dec. 1994; SRC; 1–19.*
Greg Nelson; Juno, a constraint–based graphics system; Jul. 22, 1985; ACM; 0–89791–166–0/85/007/0235; 235–243.*
Heydon et al., "The Juno–2 Constraint–Based Drawing Editor"; Digital Equipment Corporation; SRC–Research Report 131a, Dec., 1994.

* cited by examiner

Primary Examiner—Emanuel Todd Voeltz
Assistant Examiner—Joseph P. Hirl
(74) Attorney, Agent, or Firm—Dirk Brinkman; Andrew Curtin

(57) ABSTRACT

A system enables an interactively guided heuristic search for solving a combinatorial optimization problem. The system initially performs a hill-climbing search on the combinatorial optimization problem to obtain a solution using initial default parameters. The current solution and the combinatorial optimization problem are visualized on an optimization table, a table-top display device. The parameters are altered based on the visualization of the combinatorial optimization problem and the current solution. Then, the searching, visualizing, and setting are repeated until the solution is selected as an acceptable solution of the combinatorial optimization problem. During the repeating, the parameters can be a set of probabilities, and in which case the search is a random perturbation-based search. Alternatively, the parameters can be a set of priorities, in which case the search is an exhaustive local search.

15 Claims, 6 Drawing Sheets

(4 of 6 Drawing Sheet(s) Filed in Color)

INTERACTIVE HEURISTIC SEARCH AND VISUALIZATION FOR SOLVING COMBINATORIAL OPTIMIZATION PROBLEMS

FIELD OF THE INVENTION

This invention relates to methods of operating digital computers to perform heuristic searches, and more particularly, to a system and method for solving combinatorial optimization problems.

BACKGROUND OF THE INVENTION

Practical enumerative search or combinatorial optimization problems occur in a variety of fields including scheduling, routing, design layout, engineering disciplines, management and econometrics. Solutions to these problems are characterized by identifying an optimum combination of individual choice selections from among a multitude of possibilities. Examples of such enumerative search, graph search, or combinatorial optimization problems include moves in board games such as chess or go, determining how articles of different sizes can be packed in containers of limited capacity, determining optimum scheduling of operations in a manufacturing process, and capacitated vehicle routing with time windows.

Enumerative search, or combinatorial optimization problems is a well established field, for example, see Aho et al. in "Data Structures & Algorithms," Addison-Wesley Reading, 1983. In principle, combinatorial optimization problems can be solved by testing all possible combinations of choices and selecting only those combinations that give the most favorable result. However, other than in simple problems, the number of possible combinations rapidly becomes so large that, even when digital computers are employed, the solution of a single problem on a single processor may take hours, days, sometimes even months or years.

In the prior art, the time required to solve combinatorial optimization problems has been reduced by using efficient heuristic methods that are not guaranteed to find an optimal solution, but one that is near optimal. Typical heuristic methods combine some form of gradient-descent search to find local optima with some strategy for escaping non-optimal local optima. For to example, annealing resolves the problem of getting stuck in local optima by allowing "moves" to inferior solutions. By letting the minimizing heuristic accept occasional uphill moves, the heuristic can escape from a local optimum "gully" and eventually fall into a possible "valley" to find a global optimum. The probability to go back, that is, moving uphill, decreases with time, and the heuristic will finally "freeze" in a local optimum. However, these systems do not have any performance guarantees, and may often return solutions that are far from optimal.

One idea for improving the performance of search techniques for combinatorial optimization problems is to involve the human user in the search process via a cooperative interface technique. A specific technique that does this is called interactive evolution. Because cooperative interface paradigms like interactive evolution have been used mostly for designing various kinds of computer graphics, these are best characterized in terms of a design process rather than an optimization process. Generally, interactive-evolution systems generate successive sets of designs, based on previous designs, and a user selects which designs to accept for further refinement, and which to reject. Thus, designs evolve, subject to user-supplied selection criteria, see Kochhar et al. in "User control in cooperative computer-aided design," Proceedings of the 1990 ACM SIGGRAPH Symposium on User Interface Software and Technology, pp. 143–151, 1990.

Constraint-based interfaces constitute yet another human-computer cooperative technique for design/optimization tasks. These are popular in drawing applications, see Nelson et al. in "The Juno-2 Constraint-Based Drawing Editor," Digital Equipment Corp. SRC—Research Report 131a, 1994. Typically, the user imposes geometric or topological constraints on a nascent drawing such that subsequent manipulation is constrained to useful areas of the design space.

SUMMARY OF THE INVENTION

The invention provides a cooperative-interface technique that partitions combinatorial optimization problems into two tasks, one for the user and one for the computer processor, to facilitate a human-guided search. The processor is only responsible for finding local optima using, for example, a hill-climbing search which can be either greedy (best first) or steepest ascent (shortest). The result of the search is visualized, and the user identifies promising regions of the search space for the processor to explore. The user can also intervene to help the processor escape non-optimal local optima, or change the constraints of the optimizing function. The general strategy combines heuristic-search and information-visualization techniques in an interactive system. In a specific application, the invention is applied to the problem of capacitated vehicle routing with time windows (CVRTW).

More specifically, the invention provides a system and method that enables an interactively guided heuristic search for solving a combinatorial optimization problem. The system initially performs a greedy hill-climbing search to obtain an initial solution to a combinatorial optimization problem using initial default parameters for the search process.

The initial solution and the combinatorial optimization problem are visualized on an optimization table, a table-top display device that is suitable for group viewing and interaction. The parameters of the search process are then altered by the user based on a visualization of the combinatorial optimization problem and the initial solution. Then, the searching, visualizing, and parameter setting are repeated until the current solution is selected as an acceptable solution of the combinatorial optimization problem is by the user. The term "acceptable" is used here instead of "optimal" because the user can certainly accept a less than "optimal" solution based on facts and conditions known only to the user. Potentially, these facts and conditions could be impossible to duplicate in a pure process driven search to determine an optimal solution.

During the repeating, the search-process parameters can be a set of probabilities, if the search is a random perturbation-based search. Alternatively, the search-process parameters can be a set of priorities, if the search is an exhaustive local search.

BRIEF DESCRIPTION OF THE DRAWINGS

The patent or application file contains at least one drawing executed in color. Copies of this patent or application publication with color drawing(s) will be provided by the Office upon request and payment of the necessary fee.

Figure 4:
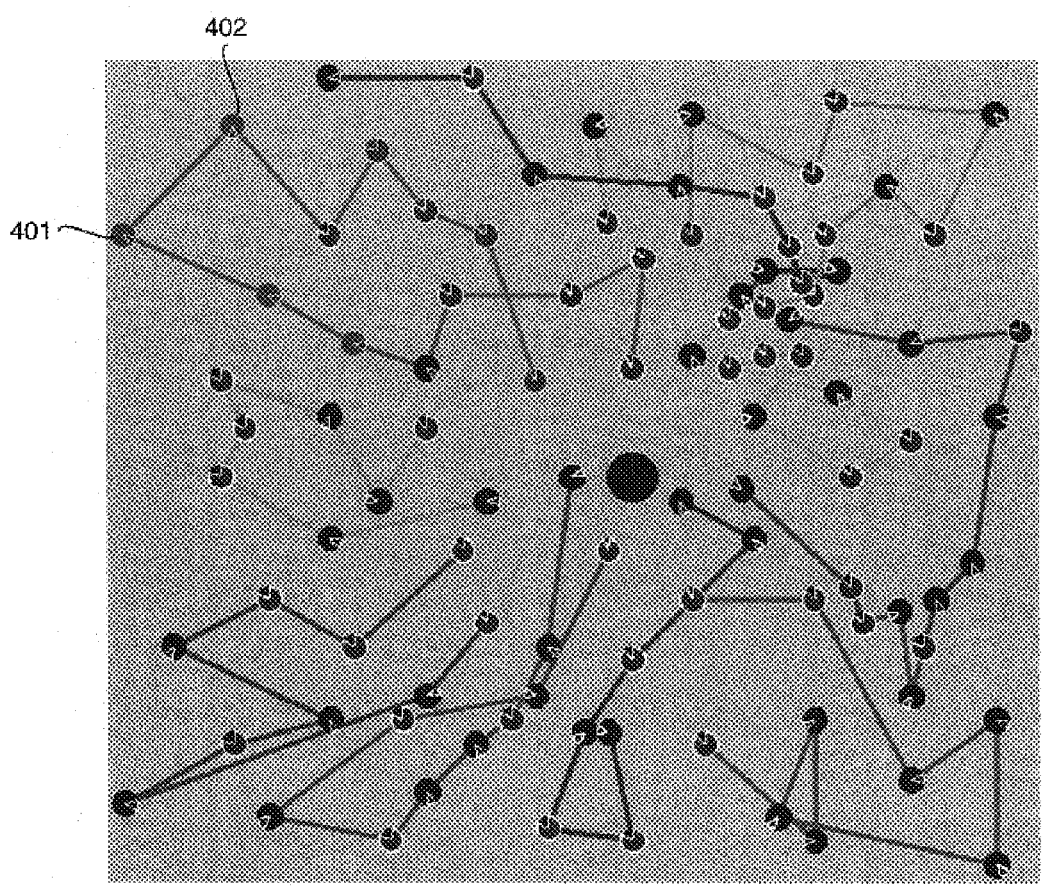
Figure 5:
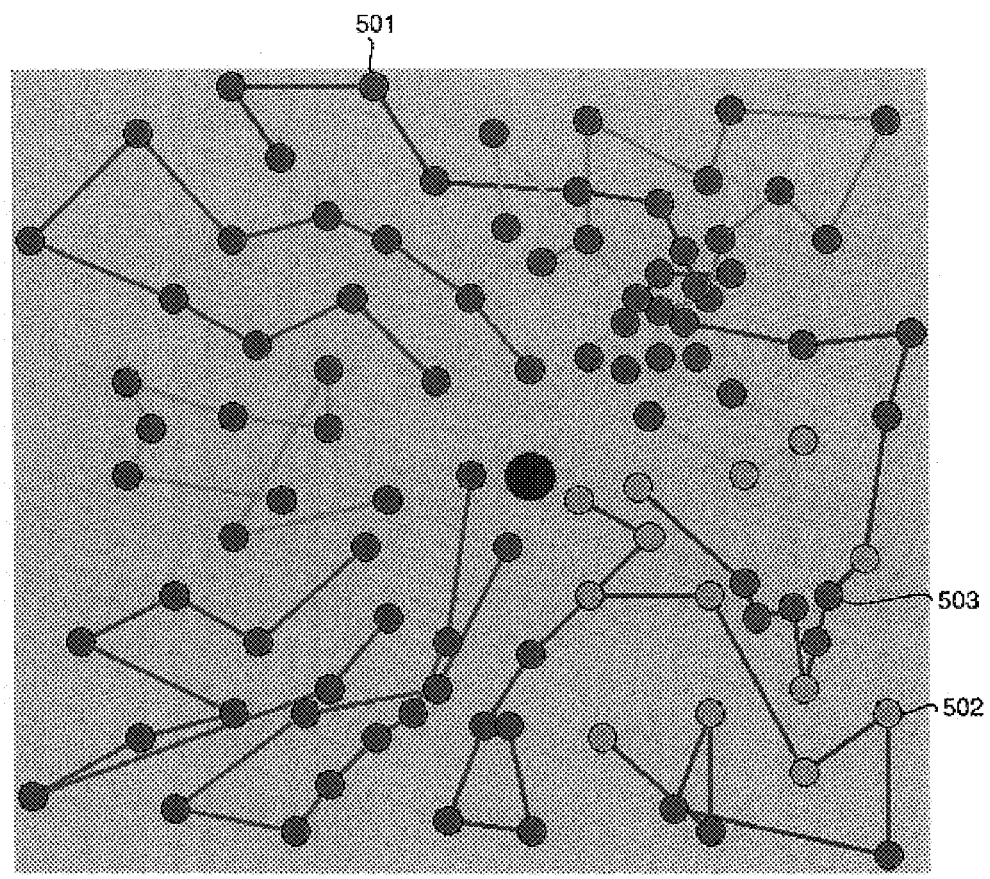

FIG, 3 shows the solution of FIG. 2 at some later time;

FIG. 4 shows an infeasible solution, with unsatisfied customers highlighted;

FIG. 5 shows perturbation probabilities; and

Figure 6:
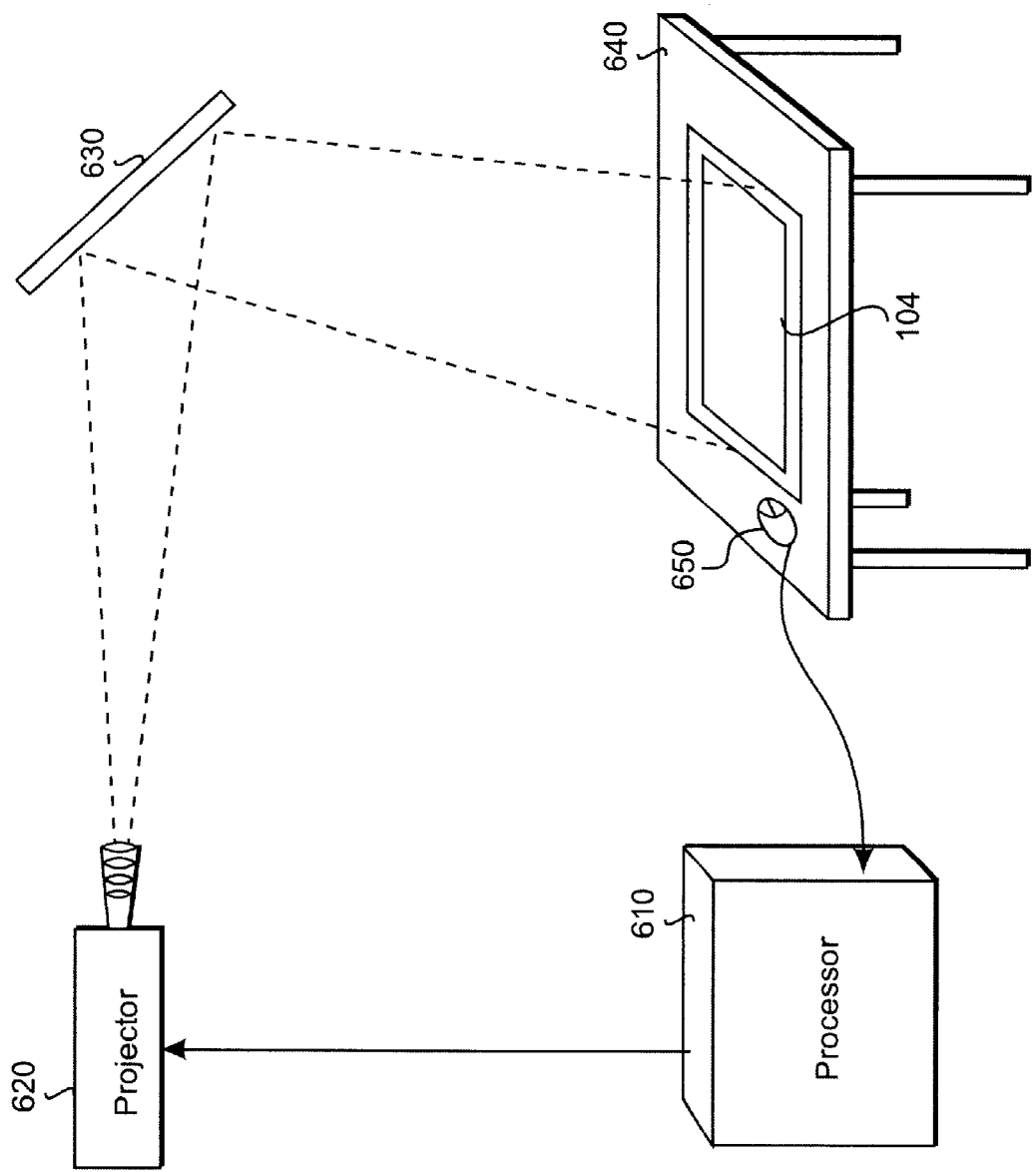

FIG. 6 is a diagram of a visualization system including an optimization table according to the invention.

DETAILED DESCRIPTION OF THE PREFERRED EMBODIMENT

Introduction

While computers and computerized methods are well suited for solving many combinatorial optimization problems, our invention takes advantage of the fact that people are superior to computers at certain aspects of optimization. In particular, people can make use of visualizations to identify promising regions of a search space, or make changes to a current solution that dramatically reduce its quality but are more likely to result in a better solution after local improvements are applied.

Our invention provides a human-guided heuristic search for solving combinatorial optimization problems. A processor performs a hill-climbing search, but two methods enable a person or group of people to "steer" the search process. First, a user can intervene to escape a local optimum by manually editing a current solution. Second, the user can influence the order in which the potential improvements are considered in the search. In both methods, the user makes use of visualizations of the problem and a solution instance when intervening.

System Overview

Figure 1:
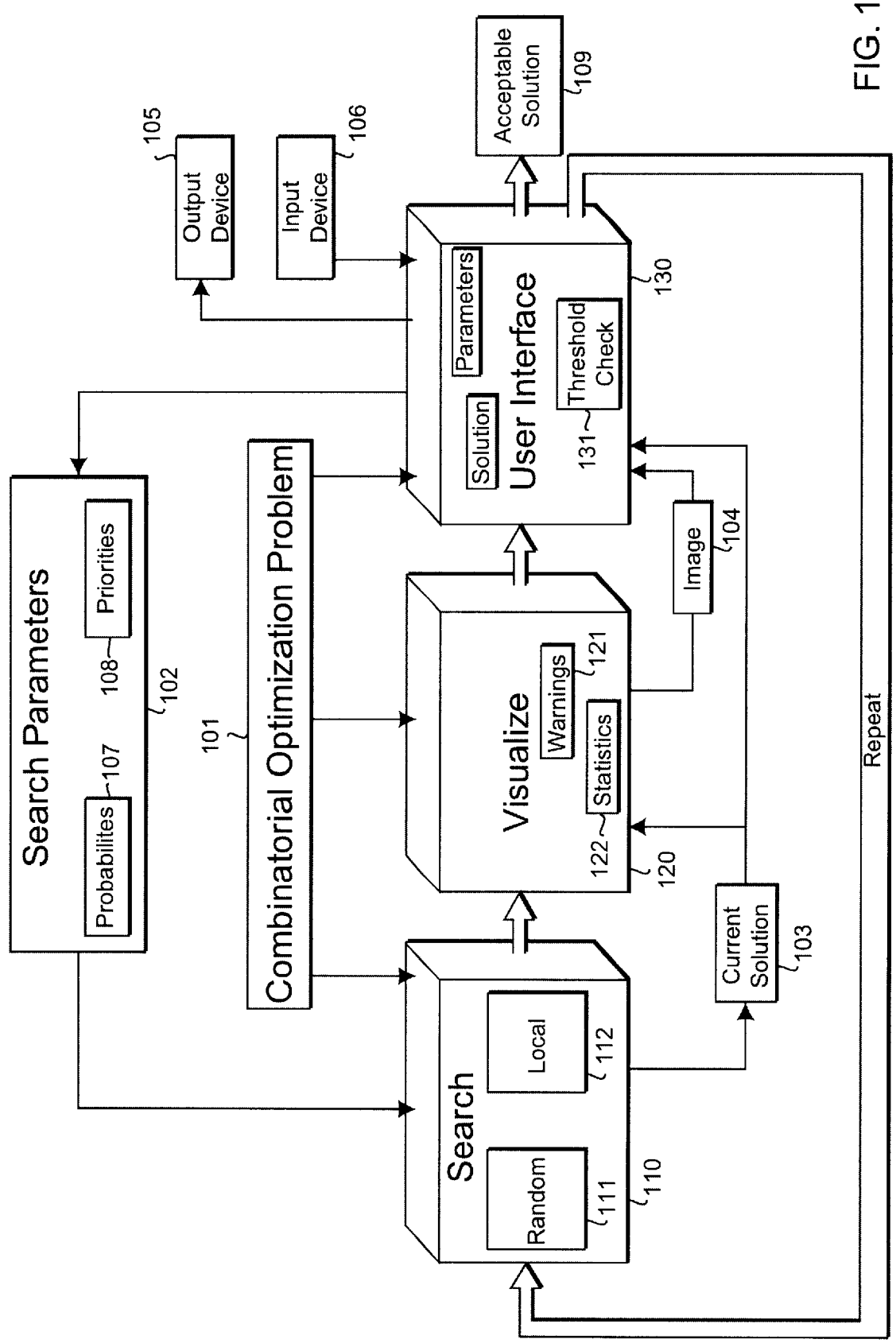
FIG. 1 is a flow diagram of an interactive cooperative search method according to the invention.

As shown in FIG. 1, our method 100 begins with a search step 110. The search step finds a solution 103 to a combinatorial optimization problem 101 according to initial search parameters 102. The search and the parameters are described in greater detail below.

In step 120, the combinatorial optimization problem and the current solution are combined to form an image 104. The visualization process can add search warnings 121 and search statistics 122 to the image 104.

A user interface step 130 renders the image on an output device 105. In response to the rendering, the user can alter the search parameters or the solution using an input device 106. The search parameters can be either a set of probabilities 107, or a set of priorities 108. If the search parameters are probabilities, then the search that is performed is a random perturbation-based search 111 on the entire problem. On the other hand, if the search parameters are priorities, then local exhaustive searches 112 are performed based on the priorities.

The searching, visualizing, and interfacing steps are repeated until the current solution is an acceptable solution 109 according to user definable threshold metrics 131, and the method 100 completes. As an advantage of our invention, the solution that is accepted by the user may well be less than optimal according to the search heuristics. This is because the user may have knowledge of real-world constraints that are too difficult or impossible to express in the search heuristics 110. Also, in order to find an acceptable solution, the user can force the system to pass through infeasible solutions.

Application

We will now describe our invention in terms of an example application. However, it should be understood that our invention can be used for many other combinatorial optimization problems.

Our example application is the well-known capacitated vehicle routing with time windows (CVRTW) problem, see Solomon in "Algorithms for the vehicle routing and scheduling problems with time window constraints," Operations Research, 35(2): pp. 254–265, 1987. In this application, trucks deliver goods from a single central depot to customers at fixed geographic locations. Each customer demands a certain quantity of goods. In addition, each customer specifies a time window within which delivery of the goods must commence. All trucks have the same fixed capacity. The trucks travel one unit of distance in one unit of time. Delivery takes a constant amount of time, and each customer can receive only one delivery. All trucks must return to the depot by a fixed time.

First, the combinatorial optimization problem minimizes the number of trucks required to deliver all the goods, and second, it minimizes the distance traveled by the trucks. Alternatively, the optimization problem may just minimize the distance traveled by the trucks.

The CVRTW problem is a good sample application for the following reasons.

The CVRTW problem has computational complexity. Even when a truck has been assigned a list of customers, optimizing its route is an instance of the traveling salesman problem with time windows. This is an NP-hard problem. A problem is assigned to the nondeterministic polynomial (NP) time class if it is solvable in polynomial time by a nondeterministic Turing machine. A problem is said to be NP-Hard if a method for solving the problem can be translated into one for solving any other NP-problem. NP-hard problems are thought to be intrinsically difficult to solve. The combined problem of partitioning the customers among trucks and optimizing the trucks' routes is even harder, because it combines two subproblems, each of which is NP-hard. The development of exact and heuristic algorithms for CVRTW has been the subject of concentrated research for over twenty-five years.

The CVRTW problem also has real-world complexity. Although the problem is usually cast as an abstract mathematical problem, the CVRTW comes close to capturing many of the vehicle-routing constraints and objectives that arise in the real world. In particular, instances and solutions of the CVRTW problem are difficult to visualize.

Our invention partitions the work between the system and user as follows. Again referring to FIG. 1, our method begins with a hill-climbing search 110 to find an initial solution to the CVRTW problem according to initial default search parameters 102. The hill-climbing can be greedy or steepest ascent. In either case, the search can be performed in two ways.

Random Perturbation-Based Search

The first is the random perturbation-based search 111. In such a search a randomly chosen customer is transferred from one truck to another randomly chosen truck. A deterministic branch-and-bound process is then used for optimizing the effected truck routes. As noted above, determining a route for a truck after customers have been assigned to it is an instance of the Traveling Salesman Problem with time windows. Although an NP-hard problem, the instances are typically small enough, usually five to ten customers are assigned to each truck in near-optimal solutions, so that an exhaustive search is feasible. Random perturbations that result in a better solution, i.e., fewer trucks, or a shorter total distance, are kept. Perturbations that result in a worse solution are rejected.

Exhaustive Local Search

The second form of hill-climbing search is the exhaustive local search 112. In this search, all solutions are examined that differ from the current solution by the movement of fewer than n customers from their current trucks to some others, where n is typically a small number like one or two. Any reassignment of one or more customers that improves the current solution is kept, and the exhaustive local search restarted from the current solution. The assignments can be random. The search is continued until a user-specified time expires or an iteration limit is exceeded.

Both forms of greedy hill-climbing search can be influenced by a user's interactions in two ways. The first is a manual modifying of the solution for the next iteration. For example, the user can manually move a customer from one truck to another, which automatically invokes the route-optimization procedure for the affected routes. This is one mechanism for escaping local optima found by either form of the greedy search. Typically, the user will move customers that appear problematic in the current solution, e.g., those that require a truck to go far out of its way to service the customer. The user can identify problematic customers by inspecting the visualization of the CVRTW problem and the current solution.

The second way that a user can influence the greedy search is by manipulating the search-process parameters 102. For the random perturbation-based search 111, the user can guide the search by altering the probability 103 with which a given customer will be chosen in the random perturbation process. Typically the user will assign high probabilities to problematic customers, again based on an inspection of the visualization of the CVRTW problem and its current solution. For the exhaustive local search 112, the user can guide the search by altering the priorities 104 of customers, which determine the order in which customers will be considered in the exhaustive local search. By assigning high priority to problematic customers, more promising reassignments of customers to trucks will be investigated earlier in this search process.

A sample interaction with our system is illustrated in FIGS. 2–5.

Figure 2:
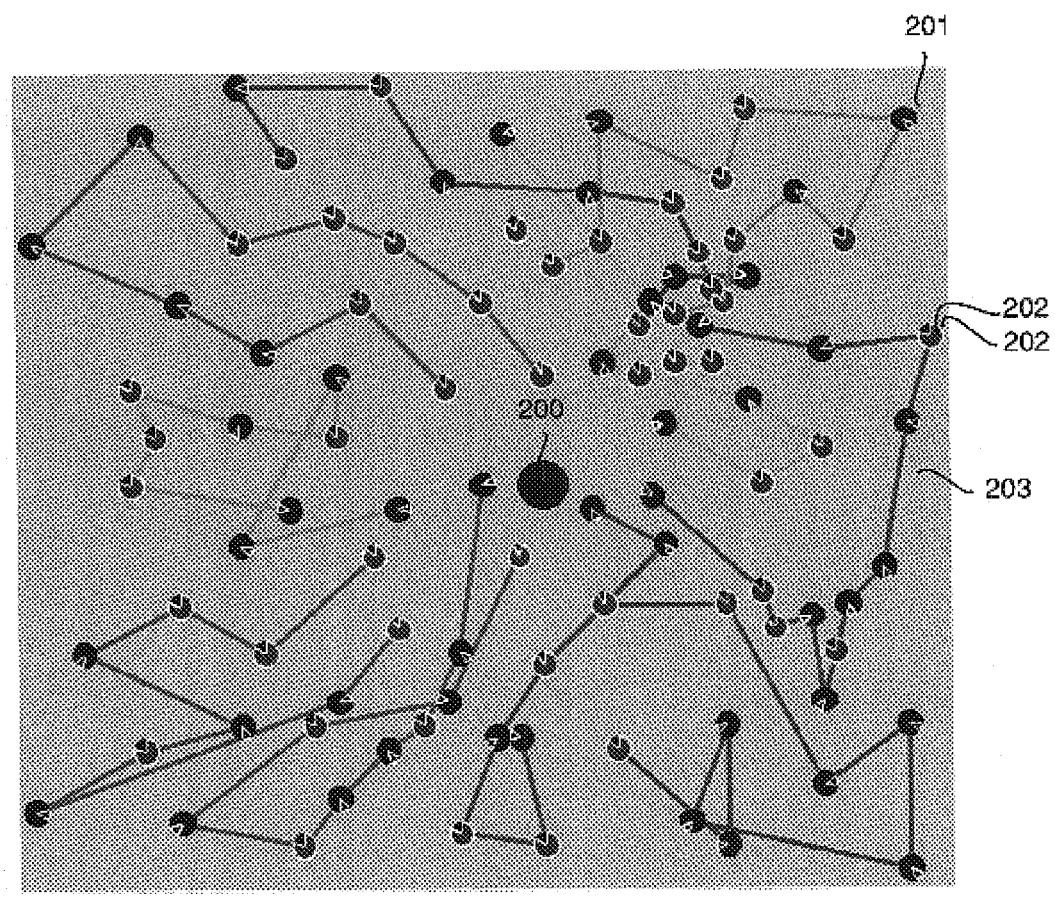
FIG. 2 shows an initial solution to the search of FIG. 1 at zero time.
Figure 3:
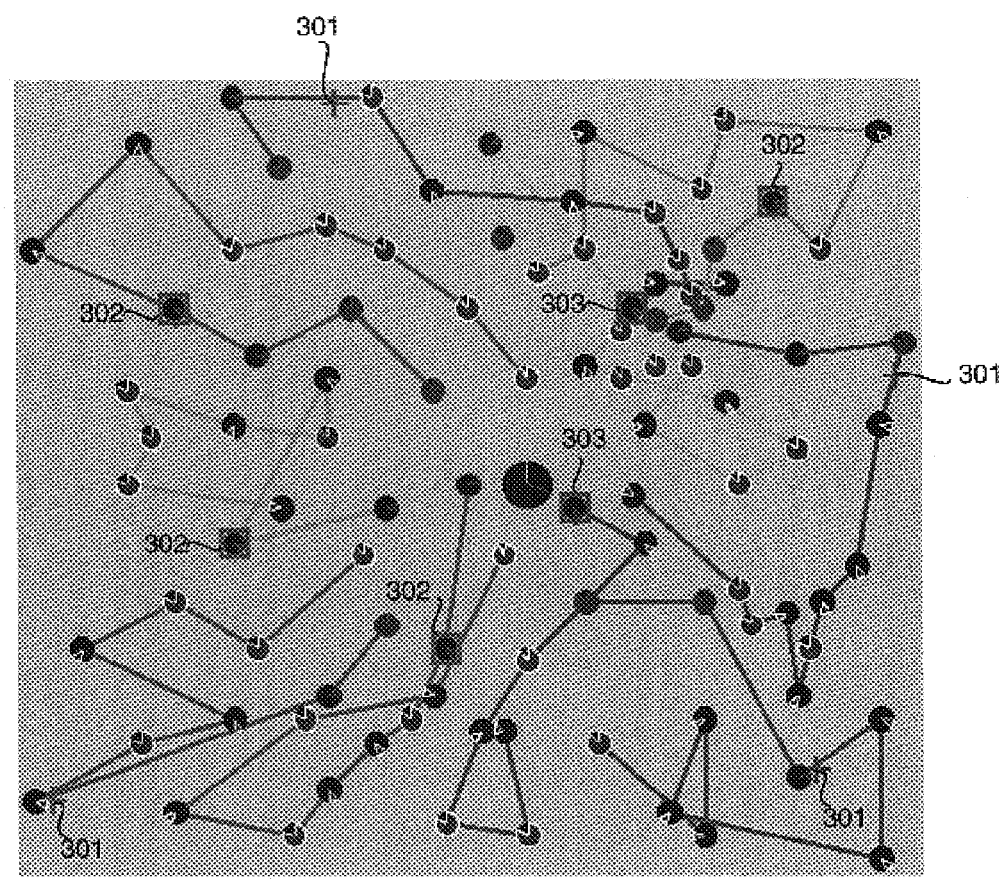

FIG. 2 shows an initial solution at zero time. FIG. 3 shows the same solution at some later time. FIG. 4 shows an infeasible solution, with unsatisfied customers highlighted. FIG. 5 shows perturbation probabilities.

The solution of FIG. 2 is determined by a fast, but less-than-perfect route-building heuristic. The central depot is the black circle 200 at the center of the display. The other circles 201 represent customers. The "clock hands" 202 in the customer circles indicate the time window during which they are willing to accept delivery. The truck routes are shown by lines 203. The first and last segments of each route are not shown, otherwise the area around the depot would become too cluttered.

As shown in FIG. 3, moving trucks are shown as crosses 301 that follow their respective lines. Customers currently receiving a delivery are highlighted with a surrounding box 302. If a truck arrives at a customer too early, then it must wait. This is shown as a box of a different color 303.

FIG. 4 shows the display of a warning due to an instance where a truck arrives at a customer too late, or with too few goods to deliver. This can happen when the user creates an infeasible solution through manual assignment. Sources of infeasibility are shown via colored iconography 401 or balloon data windows. Statistics such as the remaining capacities of the trucks can also be shown.

The two user operations are supported by the user interface. The operations are manual reassignment of customers to trucks and interactive manipulation of search-process parameters. A customer can be transferred to another truck's route by simply selecting first the customer, and then the new route using the input device. Search-process parameters, such as perturbation probabilities or exhaustive-search priorities, can be modified by first selecting one or more customers, and then altering their search-process parameters via a menu.

As shown in FIG. 5, typical values for the perturbation probabilities or exhaustive-search priorities are "low" 501, "medium" 502, or "high" 503 which can be shown in different colors, for example, red, yellow, and green. Current values of the perturbation probabilities or exhaustive-search priorities can also be viewed by changing the display mode of the user interface.

After any number of manual reassignments or perturbation-probability changes, the user can invoke the computer's search step 110 for an arbitrary number of iterations or a set maximum time, or until predetermined solution threshold metrics are reached.

FIG. 6 shows a preferred embodiment of our invention using an optimization table. A processor 610 executes the steps of our method 100. The visualization is via a projector 620, and overhead mirror 630 onto the top of a table 640. Input for the method is provided by an input device 650, for example a mouse. As an advantage, the optimization table allows several users to conveniently collaborate in guiding the optimization process, by allowing the users to sit around the table-top display, to write on the display surface, and to place tangible markers on the display surface. The input device can interact directly with the displayed image.

In another embodiment, the visualization is Web-based. In this case, the visualization is accessed via a Web browser, and multiple users at remote locations can concurrently guide the search.

Our experience from many sessions of using the optimization table is that human-guided search is more effective than unguided search. It is quite apparent that the system according to our invention produces more acceptable solutions when people are steering the process, then if the system a greedily performs a hill-climbing search with limited ability for escaping local optima, as in most prior art search techniques. Additionally, the average improvement from the search using human-defined search-parameters appears to be greater than a completely random greedy search.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for performing a user guided computer augmented heuristic search for solving a combinatorial optimization problem, comprising: searching for a solution to a combinatorial optimization problem using discrete parameters; displaying a visualization of the combinatorial optimization problem and the solution to the user; altering the discrete parameters according to an input of the user after the displaying of the visualization of the combinatorial optimization problem and the solution; and repeatedly searching for another solution to the combinatorial problem using the most recently altered discrete parameters, displaying a visualization of the combinatorial problem and the most recently searched other solution, and altering the most recently altered discrete parameters according to another input of the user after the display of the visualization of the combinatorial problem and the most recently searched solution, until a current solution is selected by the user as an acceptable solution consistent with a predetermined optimizing threshold metric.

2. The method of claim 1 wherein, an initial search is a greedy hill-climbing search to identify a local optimum.

3. The method of claim 1 wherein an initial search is a steepest ascent hill climbing search to identify a local optimum.

4. The method of claim 1 wherein the discrete parameters are a set of probabilities, and the search is a random perturbation-based search.

5. The method of claim 1 wherein the discrete parameters are a set of priorities and the search is an exhaustive local search.

6. The method of claim 1 further comprising: modifying the solution with an input device while repeating the searching, visualizing, and altering.

7. The method of claim 1 further comprising: displaying a visualization of search warnings and search statistics to the user.

8. The method of claim 1 wherein the predetermined optimizing threshold metric includes a predetermined number of iterations.

9. The method of claim 1 wherein the predetermined optimizing threshold metric includes a predetermined time.

10. A system for performing a user guided heuristic search to solve a combinatorial optimization problem, comprising: a search engine configured to search for a solution to a combinatorial optimization problem using discrete parameters; a rendering engine configured to display a visualization of the combinatorial optimization problem and the solution; and an input device configured to enter user commands altering the discrete parameters based on the displayed visualization of the combinatorial optimization problem and the solution; wherein the search engine is further configured to search for another solution to the combinatorial problem using the altered discrete parameters, the rendering engine is further configured to display a visualization of the combinatorial problem and the searched other solution and the input device is further configured to enter other user commands further altering the altered discrete parameters based on the displayed visualization of the combinatorial problem and the searched other solution, and the other solution is selected by the user as an acceptable solution consistent with a predetermined optimizing threshold metric.

11. The system of claim 10 wherein the search engine initially performs a greedy hill-climbing search to identify a local optimum.

12. The system of claim 10 wherein the discrete parameters are a set of probabilities, and the search engine performs a random perturbation-based search.

13. The system of claim 10 wherein the discrete parameters are a set of priorities and the search engine performs an exhaustive local search.

14. The system of claim 10 wherein the rendering engine projects an image of the solution onto a tabletop.

15. The system of claim 10 wherein the input device is operated on the tabletop.

* * * * *